Sept. 16, 1930.  F. E. SHROYER  1,776,090
FISH LURE
Filed Oct. 26, 1928
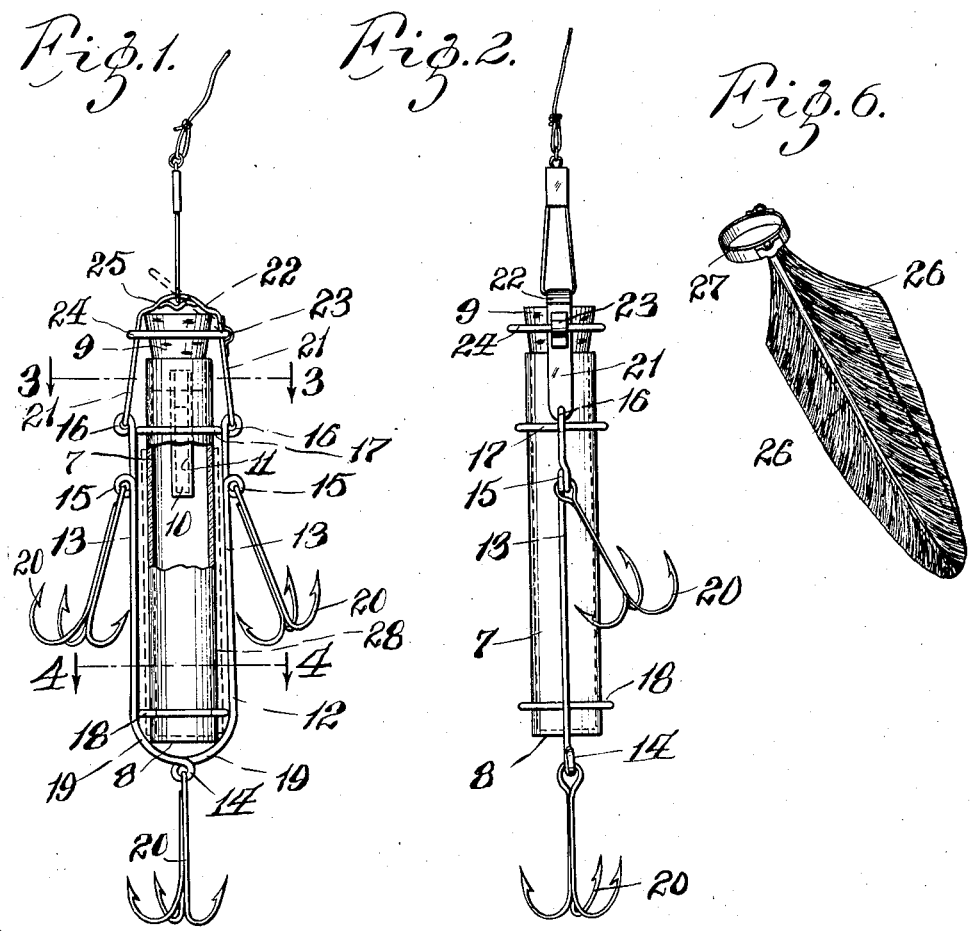
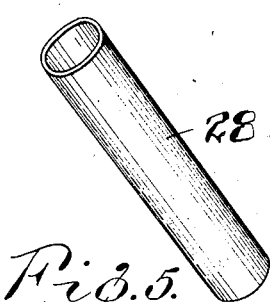
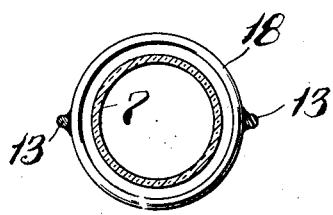
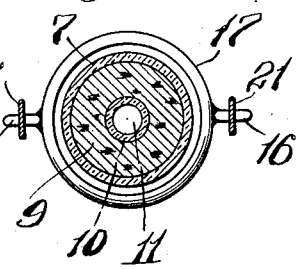
INVENTOR:
FRANK E. SHROYER.
By Edward E. Longan
ATTORNEY.

Patented Sept. 16, 1930

1,776,090

UNITED STATES PATENT OFFICE

FRANK E. SHROYER, OF GIRARD, ILLINOIS

FISH LURE

Application filed October 26, 1928. Serial No. 315,277.

This invention relates to certain new and useful improvements in a fish lure and has for its primary object the purpose of providing the device with interchangeable means whereby the device can be made to give different lure presentations.

Another object of the invention is in providing this fish lure with an illuminating or light emitting element.

A further object of the invention is in providing this fish lure with a transparent hollow member which serves as a protection for the illuminating element and which will also serve as a container for a weighing or loading agent such as water or sand so as to give the lure the required sinking or flowing weight.

Other and further objects will appear in the specification and be specifically pointed out in the appended claims, reference being had in the accompanying drawings, exemplifying the invention, and in which:—

Figure 1 is a front elevation of this improved fish lure.

Figure 2 is a side elevation of Fig. 1.

Figure 3 is an enlarged horizontal section taken approximately on the line 3—3 of Fig. 1.

Fig. 4 is an enlarged horizontal section taken on the line 4—4 of Fig. 1.

Figure 5 is a perspective view of an interchangeable tube of which several may be used, each being of a different color.

Figure 6 is a perspective view of a demountable feathered device which may be used in conjunction with this improved fish lure.

Referring by numerals to the accompanying drawings, this improved fish lure comprises a transparent tube 7 which is closed at 8 on its lower end. The open upper end is adapted to be closed by a stopper 9 and secured in the lower end of the stopper and adapted to depend into the tube 7 is a transparent container 10 in which is mounted a body of phosphorus or luminous material as indicated at 11.

For supporting the tube 7 a cage 12 is provided, said cage comprising a pair of parallel wire lengths 13 made from a single length of wire which is bent at the approximate center of its length in a manner so as to provide an eyelet 14 and intermediate of the length of each wire length 13 is formed an eyelet 15 the extending end of each wire length 13 being provided with an eyelet 16. A transversely disposed ring 17 is secured at opposite sides between the upper ends of the wire lengths 13 inwardly of the eyelets 16, the securing of the ring being done by soldering or brazing. A ring 18 is transversely secured to and between the wire lengths 13 adjacent the bent portions 19 of said wire lengths.

The cage 12 having the wire lengths 13 is for the reception of the tube 7, the outer edge of the bottom 8 of said tube resting on the bent ends 19 of the wire lengths 13, and the tube being nested in the transverse rings 17 and 18. Grouped fish hooks such as 20 are swingingly secured in respective eyelets 14 and 15.

The tube 7 is of a length so as to have its upper end extend a distance above the transverse ring 17 and swingingly secured to each eyelet 16 is an arm 21 of a yoke 22 and swingable in a bracket 23 which is borne by one of the arms 21 of the yoke 22 is a securing ring 24, said ring being adapted to be swung over the end 25 of the yoke 22 and engage the opposite arm of the yoke in a clasping manner, said yoke being made of a resilient material such as sheet brass or the like. The swinging of the ring 24 over the end of the yoke 22 would encircle the stopper 9 of the tube 7, the stopper therefore preventing the yoke from being swung downwardly on the eyelets 16 by the ring 24 engaging the stopper, the ring therefore being the holding agent for keeping the cage in contact over the tube 7.

A fish lure of this improved character is adaptable for night fishing by reason of the fact that the luminous element in the container 10 will emit a phosphorus light which will be projected or emitted through the transparent tube 7.

If it is required that this improved fish lure be weighted by reason of the buoyancy given thereby by the corked tube 7, an amount of water or sand can be placed in the tube by removing the stopper.

For changing the fish lure so as to present a different form of lure or bait, the device shown in Fig. 6 which comprises a pair of wings or feathers 26 which are extended sidewise to form a collar 27, can be mounted in a depending manner over the upper end of the tube 7, the collar 27 being large enough to engage over the tube. In this event the ring 24 is swung upwardly in the bracket 23 thereby permitting the yoke 22 to be swung downwardly on the eyelet 16 and the collar 27 bearing the wings or feathers 26 is mounted over the upper end of the tube 7 until the collar engages on the ring 17, the collar being mounted on the tube so that the feathers 26 will be depended downwardly along the side of the tube.

For further providing this improved fish lure with different representations, a number of tubes of the proper length made from a transparent colored material such as celluloid are provided, one of such tubes being disclosed in Fig. 5 and designated as 28 and when a desired colored tube is selected, the tube 7 is withdrawn from the cage 12 and the colored tube 28 is first mounted in the cage and the tube 7 is then inserted in the colored tube 28. The yoke then is swung to a securing position over the stopper 9 of the tube 7 and the securing ring 24 is swung to a securing position on the yoke 22. A phosphorus light emitted from the luminous element 11 will present a different colored appearance through the colored tube 28.

I may, if desired, place the transparent colored tubes 28 within the tube 7 by merely withdrawing the stopper 9 and inserting a tube. When this principle is used the colored tubes need not be waterproof as is the case when they surround the tube 7 so that, instead of using a waterproof tube, strips of various colored tissue paper may be inserted in the tube 7 and the same result accomplished.

What I claim is:—

A fish lure comprising a cage formed of wire, a tube closed at one end supported in said cage, a stopper for the opposite end of said tube, a swingable yoke carried by said cage partially surrounding the stopper of said tube for preventing the accidental removal of said tube from said cage, loops formed in said cage, and hook members swingingly carried by said loops.

In testimony whereof I have affixed my signature.

FRANK E. SHROYER.